June 9, 1964            C. DOBELL            3,136,036

METHOD OF MAKING REINFORCED ROCKET NOZZLE

Filed May 29, 1959            3 Sheets-Sheet 1

INVENTOR.
Curzon Dobell

BY    *William J. Fox*

ATTORNEY

June 9, 1964   C. DOBELL   3,136,036
METHOD OF MAKING REINFORCED ROCKET NOZZLE
Filed May 29, 1959   3 Sheets-Sheet 2

INVENTOR.
Curzon Dobell

BY William Fox
ATTORNEY

June 9, 1964  C. DOBELL  3,136,036
METHOD OF MAKING REINFORCED ROCKET NOZZLE
Filed May 29, 1959  3 Sheets-Sheet 3

INVENTOR.
Curzon Dobell
BY William J. Fox
ATTORNEY

United States Patent Office 3,136,036
Patented June 9, 1964

3,136,036
METHOD OF MAKING REINFORCED
ROCKET NOZZLE
Curzon Dobell, P.O. Box 643, Nassau, Bahamas
Filed May 29, 1959, Ser. No. 816,862
7 Claims. (Cl. 29—157)

This invention relates to a method of making rocket nozzles, more particularly to light-weight ceramic nozzles which have been reinforced to withstand the high nozzle pressures and temperatures existent in rockets.

A rocket normally consists of a cylindrical body containing a head and at the opposite end a nozzle fixed to the body and having a reduced aperture through which the gases developed by the propellant in the rocket escape from the rocket and give it its thrust. The solid propellants being used today frequently contain heavy particles which are inserted in the propellant in order to increase the specific thrust of the propellant. One of the serious problems with nozzles is the abrasion caused by the high temperature and the velocity of the exahust gases containing the heavy particles. If erosion does occur in an unbalanced condition on one side of the nozzle, it frequently tends to throw the nozzle or rocket off course.

The best known material for high temperature pressure resistance is ceramic, but the problem is to reinforce such material to withstand the high temperature and high pressures.

It is therefore an object of this invention to provide a method of making a light-weight yet pressure- and temperature-resistant ceramic rocket nozzle. It is a further object of this invention to develop a method of making a ceramic rocket nozzle which will be reinforced both longitudinally and transversely. It is a further object of this invention to develop a method of making a ceramic rocket nozzle which may be easily affixed to or removed from a rocket body. This and other objects will appear as this specification proceeds.

In summary, this invention accomplishes these objectives by providing a ceramic rocket nozzle onto which there is wound under tension a thin strip of alloy metal in overlapping relationship, which metal strip is then brazed or bonded to itself to form a continuous outer tensioned layer over the ceramic body. This layer of thin metal stripping tends to put the ceramic nozzle in compression and thus causes it to be resistant to the high pressures to which it is subjected.

In order to provide a longitudinal resistance to stress there is further provided a looped prestressing wire which passes along the length of the ceramic body and around its perimeter. This may be applied first and then the thin metal stripping wrapped over it, placing the high tensile strength prestressing wire in high tension, which is translated into high compression longitudinally in the ceramic nozzle.

The thin strip of alloy metal, which might vary in thickness between one ten-thousandth of an inch to twelve ten-thousandths of an inch, and two inches wide, with its edge milled to remove edge defects, is wound around the unit in overlapping fashion and the overlapped portions are brazed or bonded to each other to provide great strength to resist the internal pressures. The metal strip is wound onto the unit under high tension, which might be applied in any one of a number of suitable ways, such as by passing the strip over a brake-drum-like arrangement which is subjected to a controlled rotational torque and thus applies a known tension to the strip. The overlapping portion of the strip is coated with a bonding or brazing material, at least over the length of it, well overlapping the previous strip in the course of its length along the vessel. A suitable brazing material for alloy steel has been found to be silver, which when heated will form quite a strong bond between the layers of the thin metal, if maintained under pressure during the application of heat. The strip may be bonded to the ceramic by adhesive or brazed to a piece of metal cast in the ceramic. It may also be overlapped and brazed to itself. The amount of overlap which exists between the various layers of the thin metal stripping is a function of the pressure to which the nozzle will be subjected and can be easily controlled during manufacture. It has been found that the brazing, with silver particularly, has a high shear strength, but if it is necessary to increase the shear strength it may be done by adding an abrasive to the silver to increase the bonding longitudinal shear strength. This abrasive might be carborundum or any suitable abrasive, but must be of extremely fine particle size, which should not be over 50% of the thickness of the metal on either side of the joint.

Reference is now made to the drawings, in which there is shown a preferred embodiment of this invention. However, these are deemed to be illustrative only and the metes and bounds of this invention should be determined from the appended claims.

In the drawings, FIGURE 1 is a sectional elevation of the rocket on the mandrel.

Figure 2:
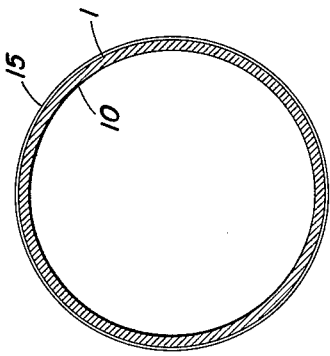
FIGURE 2 is a section through 2—2 of FIGURE 1.
Figure 1:
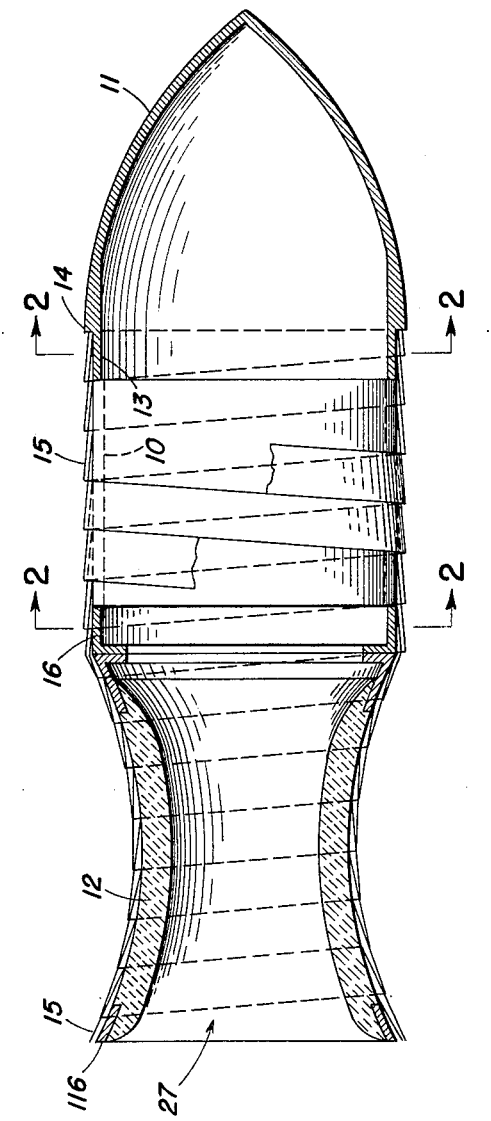

More particularly in the drawings, there is provided a core or mandrel 10 of a length and diameter to be determined according to the size of the rocket body desired. At one end of the mandrel there is mounted a nosepiece 11, which has attached to it a flange 13. Flange 13 should be the same diameter as the mandrel. The shoulder 14 formed between the nosepiece and the flange should be just large enough to contain the strip which is wrapped around the flange.

At the opposite end of the mandrel there is provided a ring member 16 formed with an inturned flange which is connected to nozzle 12. The nozzle 12 has a ceramic body provided at its forward end with a ring member formed with an inturned flange connected to the inturned flange of ring member 16, and has at its rearward end a ring member or flange 116. This nozzle has an orifice 27, through which it may be charged or filled with propellant for the rocket body, and through which the gases escape.

Figure 3:
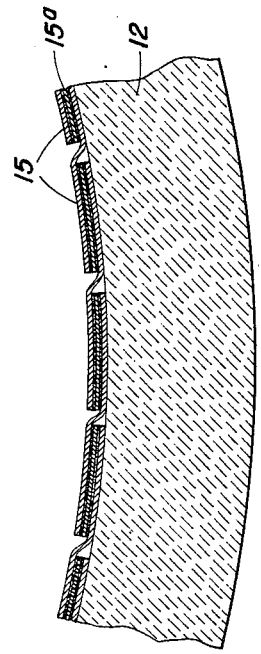
FIGURE 3 is a section showing the overlapping strips of metal with the interconnecting material.

The thin metal strip 15 is brazed to the forwardmost end or edge of the ring member 16 and is then wrapped continuously along the flange 16 and along the mandrel 10 and finally along the flange 13 in overlapping relationship. The amount of the overlap will determine the amount of the pressure that the vessel will contain. If this does not provide sufficient pressure resistance, an additional layer or layers of similarly placed strips may be applied. After the strip is wound onto the vessel, heat may be applied to the outer portion of the strip in order to cause the silver brazing material 15a or other brazing material to bond the overlapping portions of the strip to each other. The core or mandrel 10 is then removed to provide a finished body. FIGURE 3 shows the overlap of strip 15 in exaggerated form. In practice the overlap would be far greater than that shown.

Figure 4:
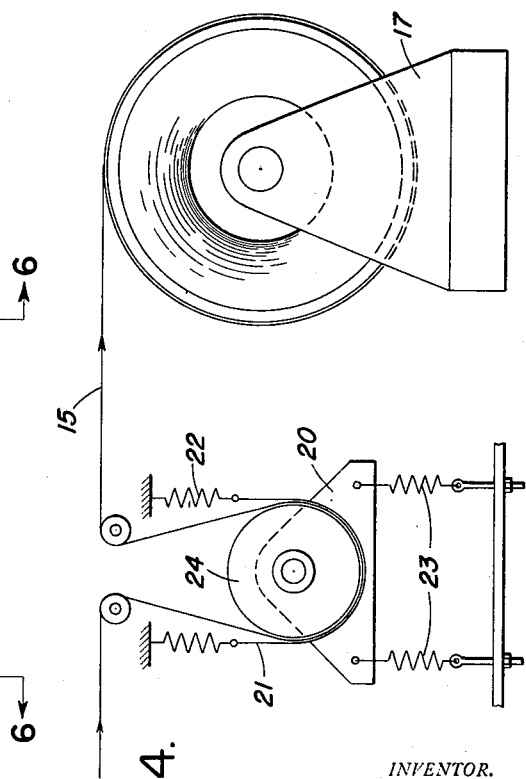
FIGURE 4 is a schematic showing of means for tensioning the metal strip.

In FIGURE 4 there is shown schematically a means of applying tension to strip 15. This strip may be passed over a plate 20 on which is mounted a drum 24, around which is a brake arrangement 21. The plate 20 is spring-mounted by means of springs 23 to move in a transverse direction. The brake arrangement 21 is similarly spring-mounted by springs 22, in order to apply a varying pressure against the drum 24. The strip 15 passes around the drum and inside the brake and is subjected to a varying but predetermined pressure and hence tensioned by the amount of spring tension applied either through springs 23 or springs 22. It then passes around the end piece flange 116 and onto the vessel as described. The mandrel and end pieces to be formed are mounted in turn in a chuck or similar arrangement 17, which is motor-driven so that they may be rotated.

Figure 5:
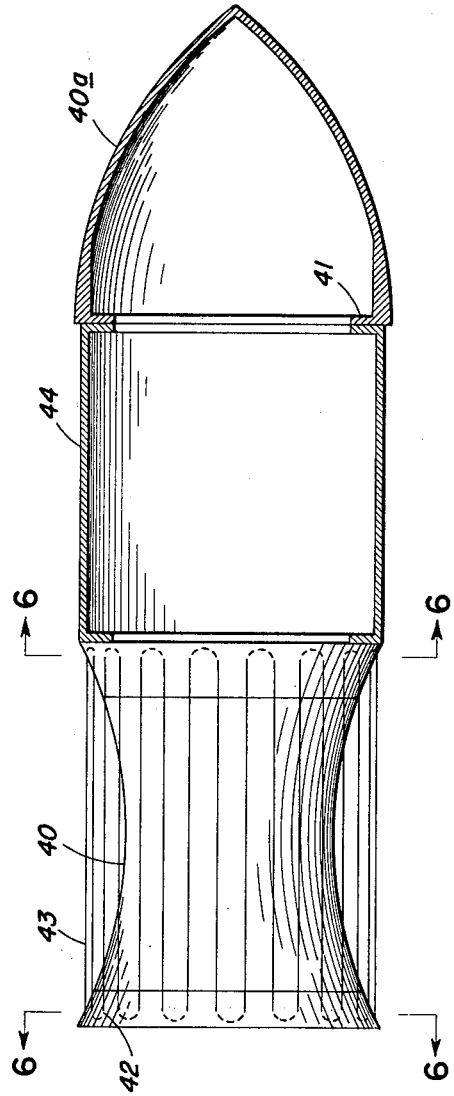
FIGURE 5 is a sectional elevation showing one embodiment of the rocket nozzle bolted to a rocket body.
Figure 6:
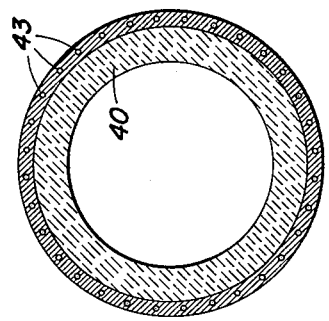
FIGURE 6 is a section through 6—6 of FIGURE 5.

In FIGURE 5 there is shown a nosepiece 40a which has a metal flange 41, by means of which it may be bolted to rocket body 44 of any suitable size and shape. The ceramic nozzle 40 connected to this rocket body has holes 42 or hairpin grooves through which or around which a high-tensile strength prestressing wire 43 may be wound around the perimeter of the nozzle.

Figure 7C:
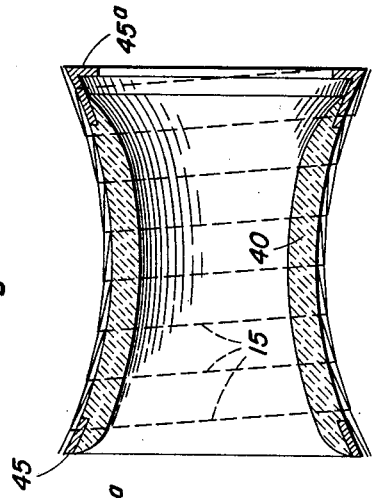
FIGURES 7a, 7b and 7c show three steps in the applying of the thin strip material and tensioning wire to the ceramic body.
Figure 7B:
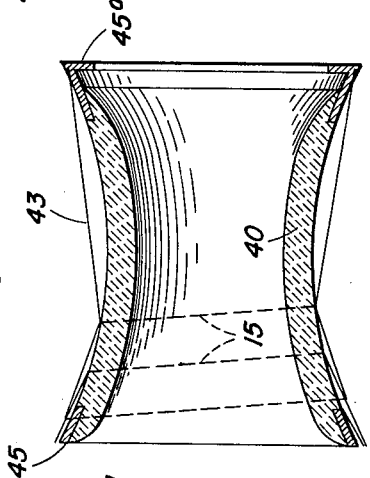
Figure 7A:
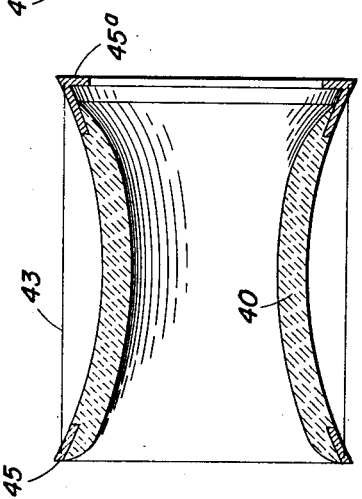

FIGURE 7a shows a ring member with inturned flange 45a affixed to the forward end of the nozzle in order to accommodate its attachment to the rocket body and a ring member 45 at the rearward end to provide surfaces for the wrapping of the thin strip 15, as discussed above.

FIGURES 7a, 7b and 7c show the sequence in forming a reinforced ceramic nozzle and in FIGURE 7a the high-tensile strength prestressing wire 43 is shown in place around the perimeter of the nozzle. In FIGURE 7b the flat thin strip 15 is begun to be wrapped around the flange 45 of the ceramic nozzle 40 in overlapping relationship and has passed onto a small portion of the nozzle so that it has forced the prestressing wire 43 tightly against the body of the nozzle. The ceramic body is provided with grooves into which the wires fit. In doing this, of course, it places the prestressing wire 43 in high tension and this in turn places the entire nozzle assembly in high longitudinal compression. In FIGURE 7c the flat strip 15 has been extended along the entire length of the nozzle body and has placed the tensioned wire 43 tightly against the body along its entire length. By thus providing a longitudinal compression through the tensioned wire 43 and a transverse compression through the tensioned strip 15, we have provided a nozzle of ceramic material which will resist the various stresses to which it will be subjected in the course of its use as a rocket nozzle.

Figure 8:
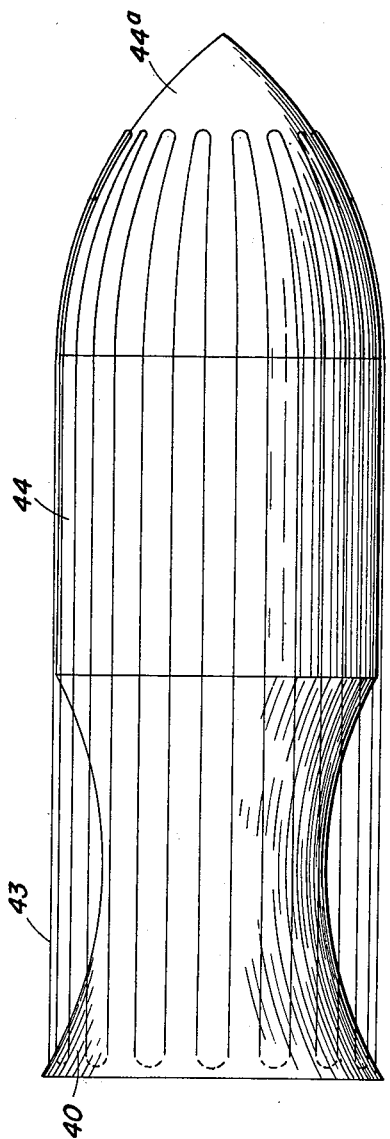
FIGURE 8 is a further embodiment with tensioning wire along the length of the nozzle and rocket body.

FIGURE 8 shows a further embodiment in which the tensioned wires 43 extend along the entire length of the nozzle 40 and the rocket body 44 and 44a. They are affixed at one end to the orifice of the nozzle and at the other end to the body nosecone 44a. By wrapping a flat strip or wire, beginning at the orifice, the wire 43 will become tensioned along its entire length and will tend to place the nozzle and the rocket body in longitudinal compression and force them tightly together.

What has been illustrated so far shows the use of a tensioned wire applied underneath a layer of thin metal stripping. It is, of course, possible, depending on the particular circumstances of the stresses involved, to first apply a layer of metal stripping 15, then apply over it the tensioned wire 43 and finally a last layer of metal stripping 15 covering the prestressing wire. A further alternative would be to apply the tensioned wire first and then to apply a plurality of layers of thin strips over it, depending on the particular tensions to which the nozzle would be subjected.

The direction of wrapping may be such that the wrapping is applied from either direction, but for wind resistance it is more desirable to wind the strip in the direction of the nose of the rocket so that the uppermost overlapped edge will be formed away from the nose. By doing this it is also possible to exert a more uniform tension in the case where the wires extend along not only the nozzle but also the body of the rocket, and thus tie the nozzle and rocket body together.

In place of a flat strip, which is the most desirable, it is also possible to use high tensile strength round wire.

I claim:

1. The method of making a rocket nozzle which comprises, providing a nozzle body having a constricted intermediate waist portion and larger diameter outwardly flared end portions, securing to the flared end portions of the nozzle and bridging the waist portion therebetween a plurality of longitudinal high tensile strength reinforcing elements peripherally spaced from one another about said nozzle body, said plurality of longitudinal elements being of a length insufficient to conform to the contour of said waist portion without being forced thereagainst, spirally winding peripheral reinforcing means under tension around said longitudinal elements and said nozzle body whereby the longitudinal elements are placed under tension, the winding operation in turn comprising the steps of securing one end of said peripheral reinforcing means to one of said flared end portions, spirally winding said peripheral reinforcing means from said one end to the other flared end portion under tension around said longitudinal reinforcing elements and said nozzle body thereby tensioning and conforming said longitudinal elements against said contour of said waist portion, and securing the other end portion of said peripheral means while under said tension to the other flared end portion for retaining said peripheral reinforcing means in place wound under tension, said spirally wound peripheral reinforcing means thus coacting with said longitudinal elements to place the nozzle body under combined radial and longitudinal compression.

2. The method according to claim 1, wherein said nozzle body is a ceramic body.

3. The method of making a rocket, which comprises providing a rocket body and a nozzle body having a constricted intermediate waist portion and larger diameter outwardly flared end portions, assembling said rocket body and said nozzle body with one flared end portion of the nozzle body adjoining a corresponding end portion of the rocket body, securing to the outer flared end portion of the nozzle body remote from the rocket body and to said rocket body and bridging the waist portion between said flared end portions a plurality of longitudinal high tensile strength reinforcing elements peripherally spaced from one another about the assembly, said plurality of longitudinal elements being of a length insufficient to conform to the contour of said waist portion without being forced thereagainst, spirally winding peripheral reinforcing means under tension around said longitudinal elements and said nozzle body whereby the longitudinal elements are placed under tension, the winding operation in turn comprising the steps of securing one end of said peripheral reinforcing means relative to one of said flared end portions, spirally winding said peripheral reinforcing means from said one end to the other flared end portion under tension around said longitudinal reinforcing elements and said nozzle body thereby tensioning and conforming said longitudinal elements against said contour of said waist portion, and securing the other end portion of said peripheral means while under tension relative to the other flared end portion for retaining said peripheral reinforcing means in place wound under tension, said spirally wound peripheral reinforcing means thus coacting with said longitudinal elements to place the nozzle body under combined radial and longitudinal compression.

4. The arrangement according to claim 3, wherein said peripheral reinforcing means is wound around said nozzle body as well as around at least a portion of said rocket body.

5. The method of making a rocket nozzle which comprises, providing a nozzle body having a constricted intermediate waist portion and larger diameter outwardly flared end portions, securing to the flared end portions of the nozzle and bridging the waist portion therebetween a plurality of longitudinal high tensile strength reinforcing elements peripherally spaced from one another about said nozzle body, said plurality of longitudinal elements being of a length insufficient to conform to the contour of said waist portion without being forced thereagainst, spirally winding peripheral reinforcing means under tension around said longiutdinal elements and said nozzle body whereby the longitudinal elements are placed under tension, the winding operation in turn comprising the steps of securing one end of said peripheral reinforcing means to a first point on one side of said waist portion of said nozzle body, spirally winding said peripheral reinforcing means axially from said first point on said nozzle body under tension around said longitudinal reinforcing elements and traversing said waist portion thereby tensioning and conforming said longitudinal elements against said contour of said waist portion, and securing the other end portion of said peripheral means while under said tension to a second point on the other side of said waist portion of said nozzle body axially spaced from said first point on said nozzle body for retaining said peripheral reinforcing means in place wound under tension, said spirally wound peripheral reinforcing means thus coacting with said longitudinal elements to place the nozzle body under combined radial and longitudinal compression.

6. The method of making a rocket, which comprises providing a rocket body and a nozzle body having a constricted intermediate waist portion and larger diameter outwardly flared end portions, assembling said rocket body and said nozzle body with one flared end portion of the nozzle body adjoining a corresponding end portion of the rocket body, securing to the outer flared end portion of the nozzle body remote from the rocket body and to said rocket body and bridging the waist portion between said flared end portions a plurality of longitudinal high tensile strength reinforcing elements peripherally spaced from one another about the assembly, said plurality of longitudinal elements being of a length insufficient to conform to the contour of said waist portion without being forced thereagainst, spirally winding peripheral reinforcing means under tension around said longitudinal elements and said nozzle body whereby the longitudinal elements are placed under tension, the winding operation in turn comprising the steps of securing one end of said peripheral reinforcing means to a first point on one side of said waist portion of said nozzle body, spirally winding said peripheral reinforcing means axially from said first point on said nozzle body under tension around said longitudinal reinforcing elements and traversing said waist portion thereby tensioning and conforming said longitudinal elements against said contour of said waist portion, and securing the other end portion of said peripheral means while under tension to a second point on the other side of said waist portion axially spaced from said first point on said nozzle body for retaining said peripheral reinforcing means in place wound under tension, said spirally wound peripheral reinforcing means thus coacting with said longitudinal elements to place the nozzle body under combined and radial longitudinal compression.

7. The method of making a rocket, which comprises providing a rocket body and a nozzle body having a constricted intermediate waist portion and larger diameter outwardly flared end portions, assembling said rocket body and said nozzle body with one flared end portion of the nozzle body adjoining a corresponding end portion of the rocket body, securing to the outer flared end portion of the nozzle body remote from the rocket body and to said rocket body and bridging the waist portion between said flared end portions a plurality of longitudinal high tensile strength reinforcing elements peripherally spaced from one another about the assembly, said plurality of longitudinal elements being of a length insufficient to conform to the contour of said waist portion without being forced thereagainst, spirally winding peripheral reinforcing means under tension around said longitudinal elements and said nozzle body whereby the longitudinal elements are placed under tension, the winding operation in turn comprising the steps of securing one end of said peripheral reinforcing means to a first point on one side of said waist portion of said nozzle body, spirally winding said peripheral reinforcing means axially from said first point on said nozzle body under tension around said longitudinal reinforcing elements and traversing said waist portion and at least around a portion of said rocket body thereby tensioning and conforming said longitudinal elements against said contour of said waist portion, and securing the other end portion of said peripheral means while under tension to a second point on said rocket body on the other side of said waist portion for retaining said peripheral reinforcing means in place wound under tension, said spirally wound peripheral reinforcing means thus coacting with said longitudinal elements to place the nozzle body and at least a portion of the rocket body under combined radial and longitudinal compression.

References Cited in the file of this patent

UNITED STATES PATENTS

| | | |
|---|---|---|
| 2,109,529 | Goddard | Mar. 1, 1938 |
| 2,191,025 | Mitchell | Feb. 20, 1940 |
| 2,395,403 | Goddard | Feb. 26, 1946 |
| 2,561,581 | Macerata | July 24, 1951 |
| 2,669,835 | Rossheim et al. | Feb. 23, 1954 |
| 2,743,514 | Duecy | May 1, 1956 |
| 2,811,773 | Baskin | Nov. 5, 1957 |

FOREIGN PATENTS

| | | |
|---|---|---|
| 809,844 | Great Britain | Mar. 4, 1959 |